Jan. 3, 1933.    P. WOLF    1,892,795
LAWN EDGING TOOL
Filed Nov. 12, 1931

Inventor
Peter Wolf
By *Arthur H. Sturges*
Attorney

Patented Jan. 3, 1933

1,892,795

UNITED STATES PATENT OFFICE

PETER WOLF, OF OMAHA, NEBRASKA, ASSIGNOR OF ONE-HALF TO JOHN STEPAN, OF OMAHA, NEBRASKA

LAWN EDGING TOOL

Application filed November 12, 1931. Serial No. 574,624.

The present invention relates to garden implements, and more particularly to an improved type of tool for edging side walks and the like, and removing the sodding and other growths overlapping the side walk and detracting from the desired neat and trim appearance of the lawn.

An object of the present invention is to provide an improved tool or implement which may be manually propelled along the edge of a lawn and which will cut, lift and carry sod and the like to one side in a free and loose state upon the side walk in such position that it may be quickly and easily removed after the work is completed.

Another object of the present invention is to provide an improved hand tool of this character which may be adjusted as to depth of cutting of the sod along the edge of a side walk.

The invention also aims at the provision of a novel construction of tool which has a plane of simplified construction which is strong and durable, which may be economically produced and a structure wherein the plow share and adjacent connecting parts may be utilized as the body frame of the tool.

With the foregoing and other objects in view, the invention will be more fully described hereinafter, and will be more particularly pointed out in the claim appended hereto.

In the drawing, wherein like symbols refer to like or corresponding parts throughout the several views.

Figures 1, 2:
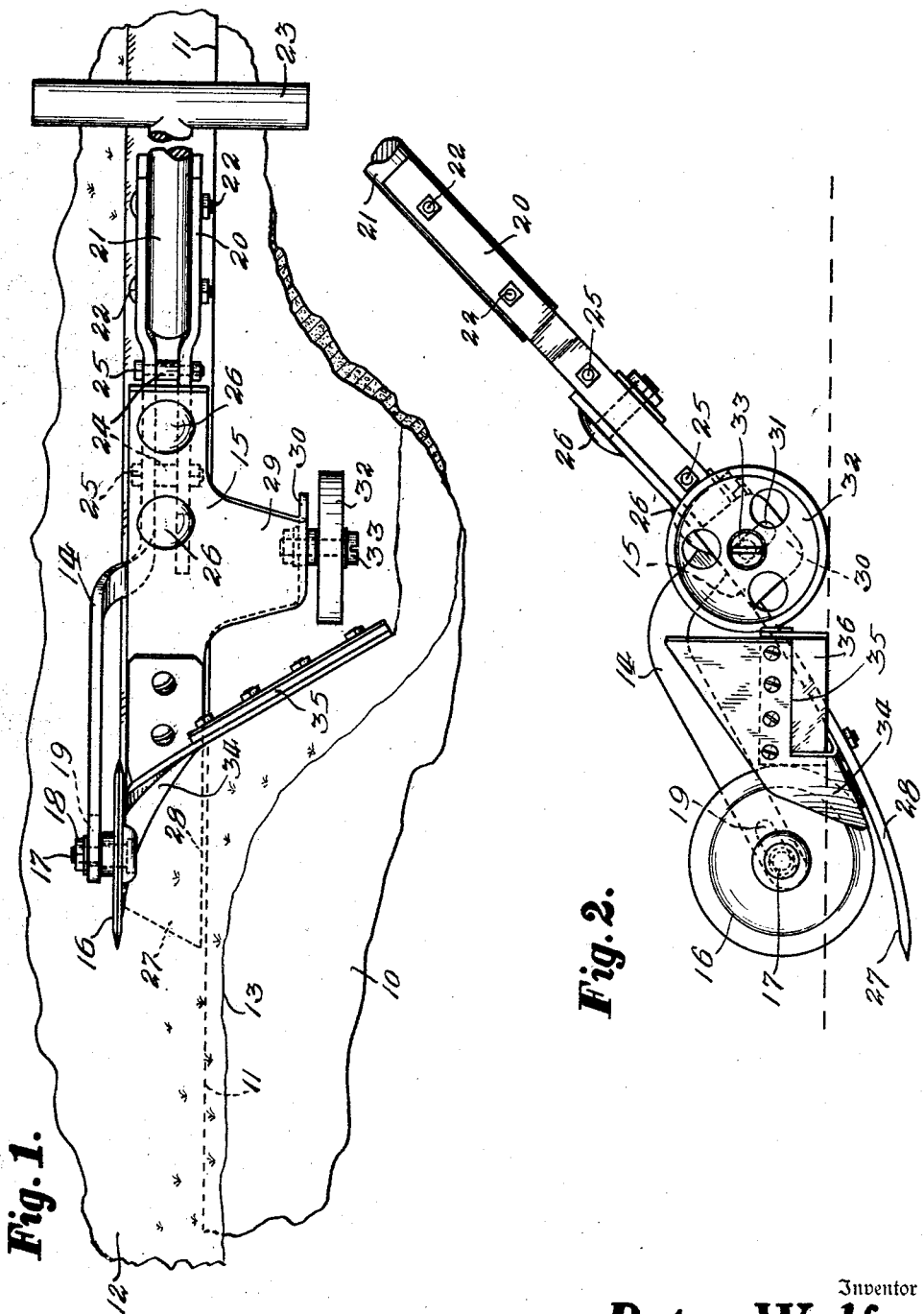
Figure 1 is a top plan view of a lawn edging tool constructed according to the present invention, and as applied to the edge of a lawn adjacent a side walk.
Figure 2 is a side elevation of the same.

Referring now to the drawing, and first to Figure 1, 10 designates a side walk of concrete, or the like, which has a terminal edge portion 11 defining the width of the walk and from which extends the usual lawn 12. As shown at the left end of Figure 1, the lawn 12 repeatedly over-grows the adjacent edge 11 of the side walk and in a short space of time presents an uneven or ragged edge 13 to the sod or other growth from the lawn 12.

The tool of this invention comprises a frame bar 14 and a frame plate 15. The bar 14 is of suitable width, is disposed edgewise in a substantially vertical position, and is provided with a forward end which extends forwardly and downwardly to support on its lower end a cutting disc 16. The disc 16 is mounted upon an axle bolt 17 which carries a clamping nut 18 and which is adapted for adjustment in a slot 19 formed longitudinally in the forward end of the frame bar 14. The cutting disc 16 is adapted to enter the ground and cut through the sod of the lawn 12 to a desired depth.

The intermediate portion of the frame bar 14 is offset inwardly so as to intersect the longitudinal vertical plane of the cutting disc 16, and the frame bar 14 is also arched downwardly at its intermediate portion and is thence bent upwardly in an edgewise direction to provide a clamping portion at its rear end. A removable clamping portion or frame bar section 20 is provided, the latter being spaced from the rear end of the frame bar 14 and serving therewith as clamping members receiving therebetween a handle 21 clamped in position by bolts 22. The handle 21 extends rearwardly and upwardly to the desired extent and may be provided upon its upper end with a cross piece 23 to facilitate grasping and manipulation of the handle.

The frame bar section 20 is held in spaced apart relation from the frame bar 14 by means of spacing sleeves 24 which are mounted on transverse bolts 25 engaging through the frame bars 14 and 20 with the spacers or sleeves 24 between these parts forwardly of the handle 21. These rear portions of the frame provide a suitable rest or shoulder for the reception of the rear end of the frame plate 15. The frame plate 15 rests across the upper edges of the frame bar 14 and the bar section 20 is clamped rigidly thereto by means of bolts 26 which pass downwardly through the frame plate 15 and through the spaces between the bar 14 and the bar section 20. This frame plate 15 extends downwardly at the inner side of the frame bar 14, the intermediate offset portion of the frame bar being carried outwardly and around the outer edge of the frame plate 15, as shown in Figure 1. The lower end of the frame plate 15 is curved forwardly to a slight extent to provide a plow point 27 adapted to enter the ground beneath the sod and opposite to or in register with the cutting disc 16.

As shown in dotted lines in Figure 1, the cutting or plow point 27 is provided with an inner straight line edge portion 28 adapted to be so placed into the lawn or sod 12 with the straight edge 28 in close proximity to the adjacent edge 11 of the side walk 10. Thus, the forward end of the frame plate 15 with its plow point 27, provides a gauge and also a guide which insures the proper positioning of the tool and also the proper travel of the tool for cutting a length of sod uniformly spaced from the edge 11 of the side walk.

The frame plate 15 is provided with a lateral extension 29 which extends from the inner edge of the plate 15 and which has at its inner or free end a down turned flange 30 provided with a longitudinal slot 31 which extends upwardly and forwardly, or substantially at right angles to the longitudinal axis of the slot 19. A roller or supporting wheel 32 is connected to the flange 30 by means of an axle bolt 33 having the usual spacing and clamping devices associated therewith, and which is adjustably secured in the slot 31 of the flange 30. Thus, the depth of the plow 27 may be regulated by the adjustment of the axle bolt 33 in the slot 31, and the pitch of the plow 27, as well as the depth thereof in the ground, may be adjusted appreciably by the axle bolt 17 in the slot 19.

The frame plate 15 carries a mold board 34 which extends substantially at 45° across the upper end of the plow point 27 and which is suitably twisted or curved for receiving the cut sod upwardly over the point 27 and not only overturning the sod, but also carrying the sod backwardly and inwardly throughout the full length of the mold board 34 so as to deposit the sod and other root accumulations on the side walk 10 at a point spaced considerably from the longitudinal edge 11 of the side walk.

For the purpose of insuring the proper cleaning away of the sod and other accumulations overlapping the edge of the side walk, the mold board 34 is provided in its rear end portion with a recess 35 which opens downwardly toward the side walk 10 and which carries therein a removable cutter or hoe 36 which is proportioned to properly engage the upper face of the side walk 10 when the tool is in position to thus insure the desired cleaning and scraping of the edge portion of the side walk as the device is propelled.

In operation, it is only necessary to position a tool along the edge of the side walk 10 with the roller or wheel 32 on the side walk 10 and the cutter 16 forced down into the sod or lawn at a point spaced from the edge 11 of the side walk equal substantially to the width of the plow point or lifting edge 27. The operator pushes the tool forwardly, or to the left as shown in Figure 1 whereupon the cutter 16 severs a width of sod from the lawn and the plow point 27 engages beneath the sod continuously, lifts the sod up over the surface of the point 27 and transfers the sod to the mold board or deflector plate 34. The sod is not only raised by this operation but is completely overturned and deposited upon the side walk 10. The mold board or deflecting plate 34 is of sufficient length to project inwardly beyond the roller or wheel 32 so that this sod is not released from the machine until it passes beyond the wheel 32 which is shown at the bottom of Figure 1. The scraper plate 36 also serves the purpose of insuring the cleaning of the upper surface of the walk 10 adjacent to the edge 11 so that the accumulations, such as dirt, sand roots and the like, embedded in the side walk will be effectively scraped or cut out of place and carried inwardly of the machine with the sods by the action of the inclined scraper 36.

The axle bolts 17 and 33 may be adjusted in their respective slots 19 and 31 for raising and lowering the body of the tool on the wheel 32 and with reference to the cutting disc 16. The disc 16 may thus penetrate the ground to the desired extent according to the thickness of the sod and the thickness of the layer of dirt which is to be moved with the sod.

It is obvious that various changes and modifications may be made in the details of construction and design of the above specifically described embodiment of this invention without departing from the spirit thereof, such changes and modifications being restricted only by the scope of the following claim.

What is claimed is:

A lawn edging tool, comprising a frame bar inclined downwardly at its forward end, a frame plate secured to the inner side of the frame bar and curved slightly upwardly at its forward end to provide a plow point and adapted to extend into the ground, said forward end of the plate being substantially of uniform width rearwardly of the point to provide a gauge for locating the curved end of the plate in the lawn adjacent the edge of a side walk, a cutting disc mounted on the forward end of said frame bar adjacent to and at one side of the forward end of said plate to sever in a vertical plane the strip of sod beneath which said plate is adapted to project, a mold board mounted diagonally across the plate and extending inwardly therefrom for projecting over a side walk and for carrying a strip of cut sod laterally on the plate to the side walk, a supporting wheel adjustably connected to said plate in rear of the mold board for movement over the pavement and to support and determine the height of said plow point in the lawn, a depending scraper on said mold board forwardly of said wheel to deflect sod and dirt disposed on the edge portion of the side walk inwardly out of the path of said wheel, and a handle connected to said plate for propelling the tool.

In testimony whereof, I have affixed my signature.

PETER WOLF.